(No Model.) 2 Sheets—Sheet 1.
C. SCHILLER.
MEAT CUTTING MACHINE.
No. 339,479. Patented Apr. 6, 1886.
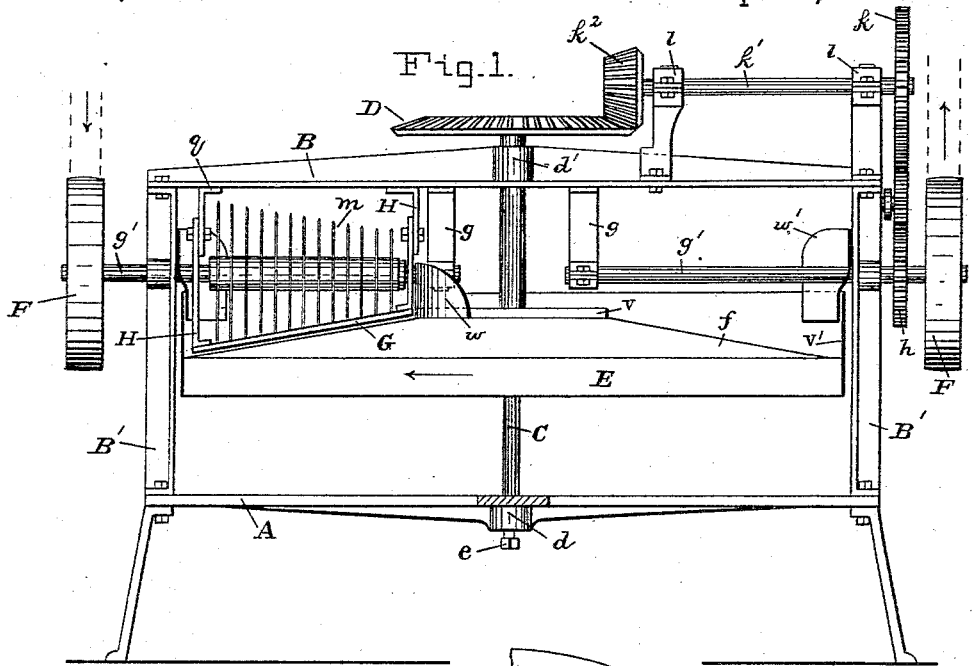
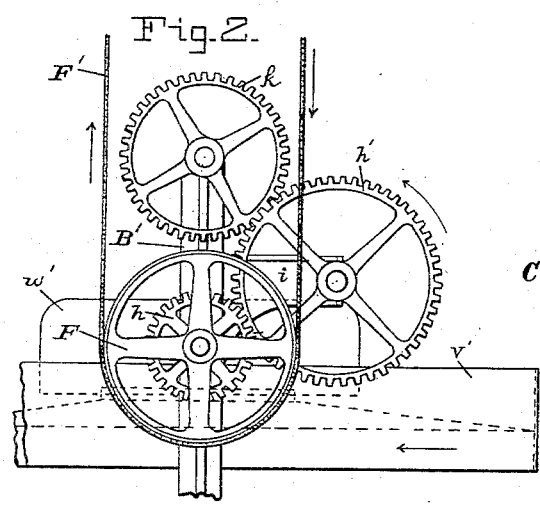
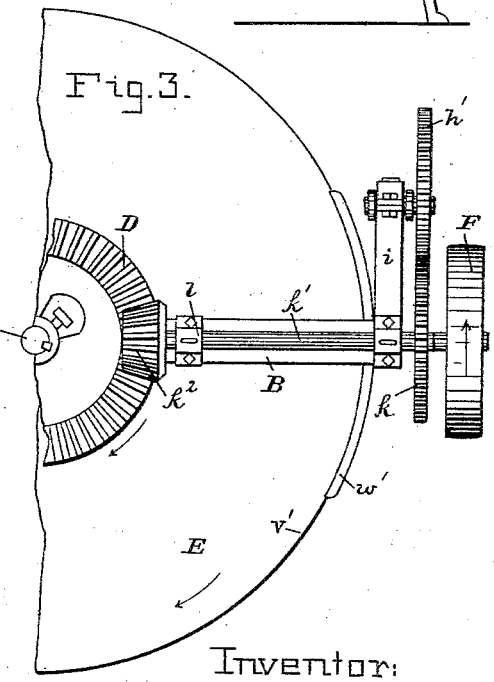
Witnesses:
A. E. Eader
John E. Morris.
Inventor:
Charles Schiller
By Chas. B. Mann
Attorney

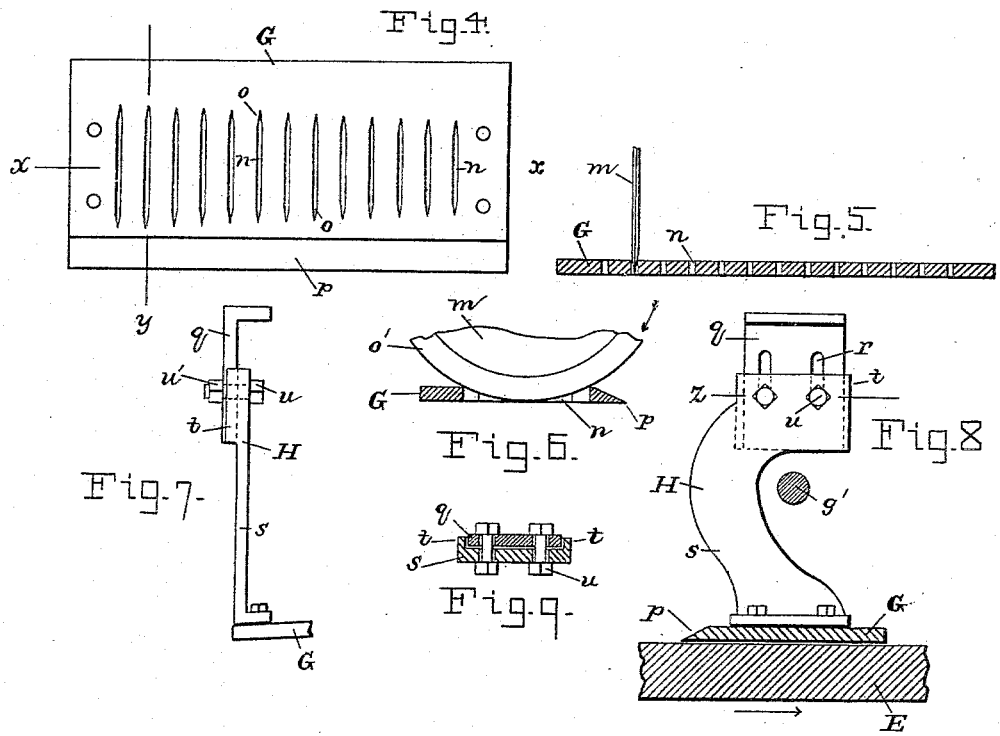
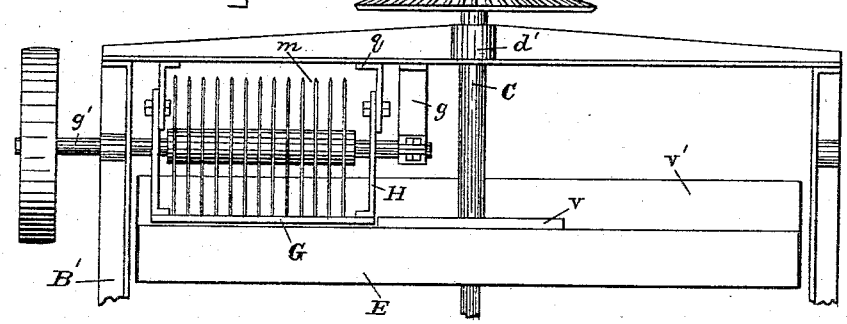

UNITED STATES PATENT OFFICE.

CHARLES SCHILLER, OF BALTIMORE, MARYLAND.

MEAT-CUTTING MACHINE.

SPECIFICATION forming part of Letters Patent No. 339,479, dated April 6, 1886.

Application filed November 11, 1885. Serial No. 182,431. (No model.)

*To all whom it may concern:*

Be it known that I, CHARLES SCHILLER, a citizen of the United States, residing at Baltimore, in the State of Maryland, have invented certain new and useful Improvements in Meat-Cutting Machines, of which the following is a specification.

My invention relates to certain improvements in meat-chopping machines of that class wherein revolving knives are employed in combination with a rotary bed or block, an illustration of which is seen in Letters Patent granted me April 30, 1878, No. 203,201.

The invention is illustrated in the accompanying drawings, in which Figure 1 is a front elevation of the machine, certain parts being in section. Fig. 2 is a view of the gearing as seen at one side of the machine. Fig. 3 is a top view of one-half of the machine shown in Fig. 1. Fig. 4 is a top view of the improved cutting-plate. Fig. 5 is a longitudinal section of the same on the line $x$ of Fig. 4. Fig. 6 is a cross-section of the same on the line $y$ of Fig. 4. Fig. 7 is a front view of one of the hangers which suspend the cutting-plate. Fig. 8 is a side view of one of the hangers, showing also the cutting-plate and the position it has relative to the rotary block. Fig. 9 is a cross-section of the hanger on the line $z$ of Fig. 8. Fig. 10 is a front elevation of the machine, in which a modification of the cutting-plate and block is shown.

The letter A designates the stand supporting a frame, B; C, an upright shaft, stepped in the stand at $d$, and vertically adjustable by a screw, $e$, entered below the stand. The shaft has a bearing, $d'$, in the top cross-bar B of the frame. Above the cross-bar a miter gear-wheel, D, is mounted on the upright shaft, and below the cross-bar the meat bed or block E is mounted to rotate in a horizontal plane. This top surface of the meat-block E may incline, as at $f$, (see Fig. 1,) from near the center to the circumference, thus making the rotary block somewhat conical, as in my prior patent above referred to; or, in consequence of the improved cutting-plate herein described, the top surface may be level, as shown in Fig. 10. A shaft-hanger, $g$, is made fast to the cross-bar B and depends toward the rotary block, and a horizontal knife-shaft, $g'$, has bearings in said hanger and in the side post, B', of the frame. A driving-pulley, F, is on the horizontal shaft, and a belt, (indicated by broken lines,) passes around said pulley and sets the machine in motion. A pinion, $h$, is also on the shaft $g'$, and gears with a wheel, $h'$, mounted on a bracket, $i$, projecting from the side post, B', and the latter wheel gears with a wheel, $k$, on an upper shaft, $k'$, which has bearings $l$ above the cross-bar B. A miter-pinion, $k^2$, on the said upper shaft, gears with the wheel D on the upright shaft, and thereby drives the rotary block. Two horizontal knife-shafts are employed—one diametrically opposite the other. The circular knives $m$ are secured on the shafts $g'$ so as to turn in a plane at right angles to the axis of the shaft. When the meat-block has a conical top surface, as in Fig. 1, the circular knives must graduate in size, the one nearest the center of the block being smallest and the outermost knife the largest; but where the meat-block has a level top surface, as in Fig. 10, the knives may all be of one size, and this construction is preferred.

The cutting-plate G is made of steel, and is shown in detail in Figs. 4 to 8. This plate is provided with slots $n$, which open entirely through the plate. Each slot has tapered ends $o$, the size and shape of which correspond with the cutting-edge $o'$ of the circular knives, each of which latter in turning has its lower part constantly in the slot. (See Figs. 5 and 6.) At least one edge of the plate has a bevel, $p$, from the top surface down.

The cutting-plate G is suspended by two vertically-adjustable hangers, H, so that the lower surface of the cutting-plate will have position very near the top surface of the rotating block E, as seen in Fig. 8. In operation the cutting-plate is stationary, while the block passes immediately below it. The hangers H consist of two pieces—an upper piece and a lower piece. The upper piece, $q$, is secured to the cross-bar B, and said upper piece is provided with one or two vertical slots, $r$. The top of the lower piece, $s$, has two parallel flanges, $t$, one of which takes on either edge of the upper piece, and thereby may slide thereon up or down. A bolt, u, passes through a hole in the lower piece and through the slot r in the upper piece, and has a nut, u', and serves to hold the said lower piece wherever it may be adjusted. Thus the slots r, flanges t, and the bolt, with nut, comprise the means for vertical adjustment. Two such hangers are employed for each cutting-plate, which must be suspended directly below the knife-shaft g'. To accomplish this, I curve the hangers laterally, as in Fig. 8, so as to pass from above down to one side and then below or under the knife-shaft. A rim, v, is on the rotary block near the center, and a stationary fender or guide, w, is secured at or near the innermost hanger H. This fender or guide takes partly around the rim v. At the outer edge or perimeter of the rotary block is an upward flange or curb, v', which keeps the meat on, and another fender, w', is fixed to each side post, and its lower edge overlaps or hangs down inside of the outer curb, v', as seen in Figs. 1 and 2. It will be seen the circular knives revolve, the meat-block rotates, and the cutting-plate G is stationary between the knives and block.

When the machine is in operation, pieces of meat to be cut are thrown upon the rotary block, and thereby are carried toward the circular knives and cutting-plate G. The meat by the rotation of the block is forced up the beveled edge p and over the plate, whereupon the knives cut it. It will be seen the cutting is done upon the stationary plate, and that the knives do not come in contact with the rotary block. Thus injury to both knives and block is avoided. When by repeated grinding of the knives they become smaller, the cutting-plate G may be elevated by altering the adjustment of the hangers, and upon so doing the rotating block E must also be correspondingly elevated by the set-screw e.

I contemplate a modification in the construction of the cutting-plate. Instead of having it in one piece, it may be composed of a plate with a central opening, separate or removable pieces of steel seated in the opening, and one piece to take position between each two knives; or, in other words, a knife-slot to be between each two pieces, thereby forming a jointed surface, and affording the advantage that the parts forming the slots may be renewed in case of wearing away of said parts. The function of the rotary block is to support the meat and carry it between the cutting-plate and knives. I may employ other devices to perform this function—for instance, a table or platen to move back and forth in a straight line, or an endless apron or belt. Such device would be the equivalent of the rotary block.

A machine having the circular knives, the movable block, and the cutting-plate between said two parts is adapted for cutting other articles besides meat.

Having described my invention, I claim and desire to secure by Letters Patent of the United States—

1. The combination of the revolving knives, the cutting-plate supported below the knives, and means, substantially as described, to carry the meat between the knives and plate, as set forth.

2. The combination of the revolving knives secured to a shaft, the cutting-plate supported below the knives, and the rotating block, as set forth.

3. The combination of the block, means to rotate and support the block, circular knives supported and rotated above the block, and the cutting-plate supported between the knives and block, as set forth.

4. The combination of the circular knives, the rotating block, and the cutting-plate provided with a beveled edge, and supported between the knives and block, as set forth.

5. The combination of a cutting-plate provided with slots, each having tapered ends, and circular knives to revolve above the plate, with the lower part of each knife constantly occupying and filling one of said slots, as set forth.

6. The combination of a stationary cutting-plate, a series of circular knives to revolve above the plate, and vertically-adjustable hangers, by which the cutting-plate is suspended, as set forth.

7. The combination of the revolving knives, the rotating block, the cutting-plate between the knives and block, and means to regulate the vertical position of the cutting-plate, as set forth.

8. The combination of the rotating block, circular knives mounted on a shaft above the block, a cutting-plate between the rotary block and the knives, and hangers having a lateral curve and supporting the said cutting-plate, as set forth.

9. The combination of the rotating block supported on an upright shaft, which has at its upper end a miter gear-wheel, D, a horizontal shaft, g', carrying circular knives, a cutting-plate vertically adjustable between the said block and knives, a horizontal shaft, k', above the knives, and provided with a miter-pinion, k², which engages with the said miter-wheel on the upright shaft, and gearing h h' k, connecting the knife-shaft with the said horizontal upper shaft, as set forth.

10. The combination of the rotating block supported on an upright shaft, revolving knives mounted above the block, a cutting-plate vertically adjustable between the said block and knives, and means, substantially as described, to vertically adjust the rotary block, as set forth.

In testimony whereof I affix my signature in presence of two witnesses.

CHARLES SCHILLER.

Witnesses:
JNO. T. MADDOX,
JOHN E. MORRIS.